United States Patent [19]

Broadt

[11] 4,385,888
[45] May 31, 1983

[54] VACUUM-FORMED HOUSING ARRAY

[75] Inventor: David R. Broadt, Lewisburg, Pa.

[73] Assignee: GTE Products Corporation, Stamford, Conn.

[21] Appl. No.: 247,979

[22] Filed: Mar. 27, 1981

[51] Int. Cl.³ .............................................. F21K 5/00
[52] U.S. Cl. ...................................... 431/359; 362/11
[58] Field of Search ................. 431/357, 359; 362/13, 362/11

[56] References Cited

U.S. PATENT DOCUMENTS

| | | | |
|---|---|---|---|
| 3,751,656 | 8/1973 | Buckler et al. | 431/359 X |
| 3,774,020 | 11/1973 | Heeman et al. | 431/359 X |
| 4,261,773 | 4/1981 | Sterling | 431/359 X |

Primary Examiner—Edward G. Favors
Attorney, Agent, or Firm—Thomas H. Buffton

[57] ABSTRACT

A multilamp photoflash array includes a plurality of interdigitated flashlamps connected to a printed circuit board and disposed within a housing member having a pair of substantially identical light transmitting side members affixed to one another and thermoformed from a single plastic sheet. The array is fabricated by a process wherein a printed circuit board is formed, flashlamps are electrically connected thereto, a housing member is thermoformed from a single plastic sheet, folded and sealed to itself and to the printed circuit board to provide an envelope containing the flashlamps.

16 Claims, 8 Drawing Figures

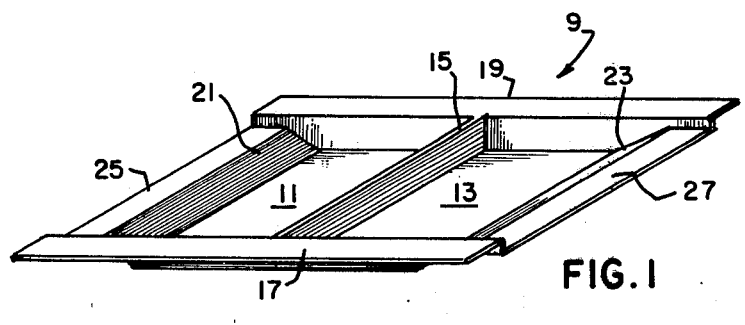
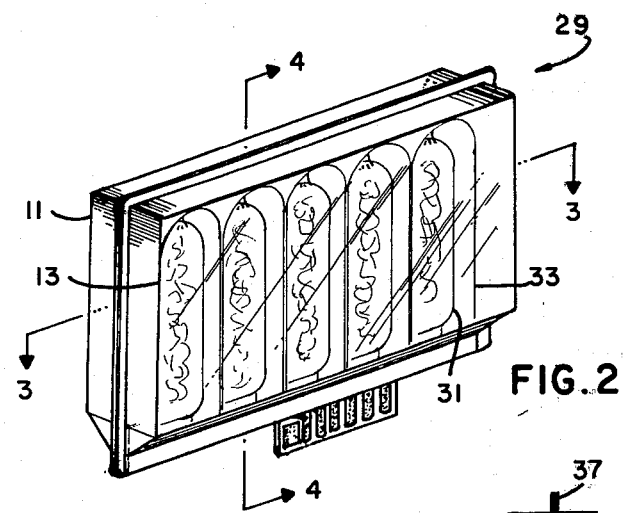
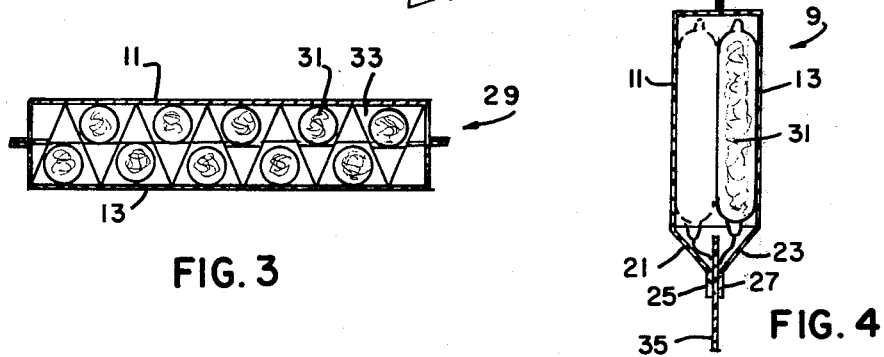
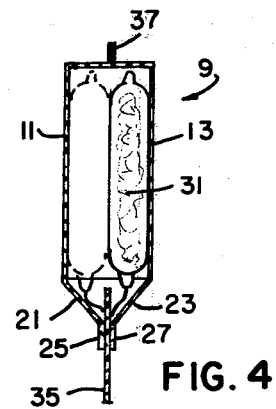
FIG. 1
FIG. 2
FIG. 3
FIG. 4

VACUUM-FORMED HOUSING ARRAY

TECHNICAL FIELD

This invention relates to multilamp photoflash arrays and more particularly to multilamp photoflash arrays and the fabrication thereof with a housing member formed from a single piece of plastic and foldable to provide an envelope having a pair of sealed light transmitting side members.

BACKGROUND ART

Generally, multilamp photoflash units have been of either a cube or a linear array configuration wherein at least two separate sections are joined together to provide a housing member. For example, cube configurations are described in the so-called flashcube of U.S. Pat. No. 3,327,105 or the magicube of U.S. Pat. No. 3,730,669. Also, linear configurations are detailed in U.S. Pat. Nos. 3,857,667 or 4,017,728.

In the cube arrangements, a plurality of lamps and associated reflectors are mounted on a base and enclosed in a cubical transparent cover. The cover is then joined to the base by heat or sonic welding. In most linear arrays, a front and a back plastic housing member are formed of relatively heavy plastic, usually by injection molding, and secured to one another by interlocking or other well known fastening means.

Additionally, a pending application assigned to the Assignee of the present application, bearing U.S. Ser. No. 181,936, filed Aug. 22, 1980, and entitled "Multilamp Photoflash Unit" relates to a form of multilamp photoflash unit. Therein, a photoflash unit has a housing member with a back portion having a plurality of flashlamp-receiving cavities aligned in a single plane and direction.

However, it has been found that such two-piece structures requiring attachment therebetween are relatively expensive. Usually the individual pieces are necessarily fabricated from relatively thick plastic in order to retain the desired rigidity needed to provide a means for attachment therebetween. Obviously, such structures are expensive of not only materials but also of fabrication time, fabrication apparatus and assembly time and apparatus. Moreover, a flashlamp unit in a single plane and facing in a single direction tends to require added space as compared with an interdigitated flashlamp array having flashlamps in back-to-back relationship.

OBJECTS AND SUMMARY OF THE INVENTION

An object of the present invention is to provide an enhanced multilamp photoflash array. Another object of the invention is to improve the housing of a multilamp photoflash array. Still another object of the invention is to provide a housing member for interdigitated reflector units in back-to-back relationship which is fabricated from a single film of plastic. A further object of the invention is to provide a multilamp photoflash array fabricating process which includes the thermoforming of a single plastic sheet to provide a housing member for interdigitated reflector units in a back-to-back relationship.

These and other objects, advantages and capabilities are achieved in one aspect of the invention by a multilamp photoflash array wherein electrically energizable flashlamps are connected to electrical circuitry of a printed circuit board and enclosed by housing member thermoformed from a single piece of plastic material to provide substantially identical light transmitting side members affixed to one another and to the printed circuit board.

In another aspect of the invention a multilamp photoflash array fabricating process is provided wherein a printed circuit board with electrical circuits thereon is formed, flashlamps are connected to the electrical circuits, a foldable one-piece housing member having a pair of substantially identical side members is thermoformed, and the side members are sealed to one another and to the printed circuit board to provide an envelope containing the flashlamps.

BRIEF DESCRIPTION OF THE DRAWINGS

FIG. 1 is an isometric view of a housing member for one embodiment of the invention prior to assembly of the photoflash array;

FIG. 2 is an elevational view of a photoflash array utilizing the housing member of FIG. 1;

FIG. 3 is a plan view of the embodiment of FIG. 2 taken along the lines 3—3;

FIG. 4 is a cross-sectional view of the embodiment of FIG. 3 taken along the lines 4—4;

BEST MODE FOR CARRYING OUT THE INVENTION

Figure 5:
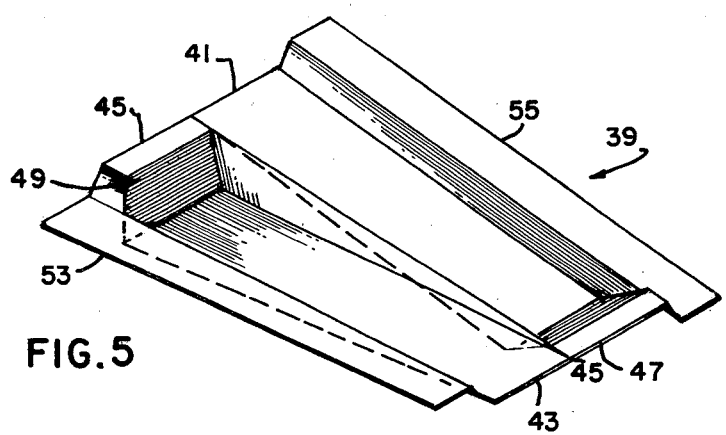
FIG. 5 is an isometric view of a housing member for an alternate photoflash array prior to assembly.

For a better understanding of the present invention, together with other and further objects, advantages and capabilities thereof, reference is made to the following disclosure and appended claims in connection with the accompanying drawings.

Referring to FIG. 1 of the drawings, a plastic housing member 9 for a multilamp photoflash array has a pair of light transmitting side members 11 and 13 respectively, separated and connected by a foldable portion 15 extending in a plane parallel to the plane of the side members 11 and 13. The opposite ends 17 and 19 of the side members 11 and 13 are in the same plane and extend in a direction normal to the foldable portion 15. Also, each of the side members 11 and 13 has a sloping or tapering portion 21 and 32 extending to a relatively flat portion 25 and 27 which is off-set from the opposite ends 17 and 19. Thus, the relatively flat portions 25 and 27 which are off-set serve to provide space for the positional location therebetween of a printed circuit board (not shown).

As can be seen more readily in FIGS. 2 and 3, a multilamp photoflash array 29 includes a plurality of interdigitated flashlamps 31 in back-to-back relationship. Each of the flashlamps 31 is disposed within a cavity of a reflector unit 33 having a reflective surface immediately adjacent the flashlamp 31. Also, each of the flashlamps 31 faces one of the light transmitting side members 11 and 13 of the housing member 9.

As can be seen in FIG. 4, each of the flashlamps 31 is connected to an electrical circuit on a printed circuit board 35. The housing member 9 is folded along a fold line 37 which extends in a plane substantially parallel to the side members 11 and 13. In this manner the tapered or sloped portions 21 and 23 provide space for connection of the flashlamps 31 to the printed circuit board 35. Also, the off-set of the relatively flat portions 25 and 27 of the housing member 9 provide space for positionally locating the printed circuit board 35 therebetween. Thus, each of the opposite ends 17 and 19 is sealed to itself and the flat portions 25 and 27 are affixed to the printed circuit board 35.

Alternatively, a housing member 39 is thermoformed from a flat sheet of plastic material to provide a pair of oppositely disposed side members 41 and 43 each tapering toward one of the opposite ends 45 and 47. A fold line 45 joins the side members 41 and 43 to one another and extends diagonally between the opposite ends 45 and 47. Again, each of the side members 41 and 43 has a sloping or tapering section 49 and 51 which connects to a relatively flat portion 53 and 55.

Figure 6:
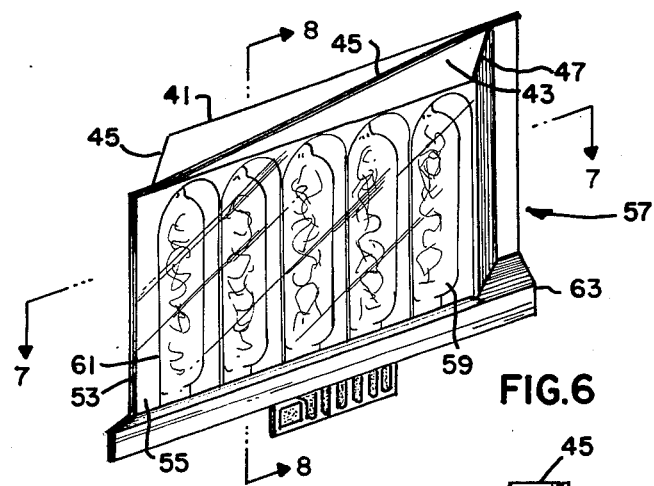
FIG. 6 is an elevational view of the photoflash array of FIG. 5.
Figure 7:
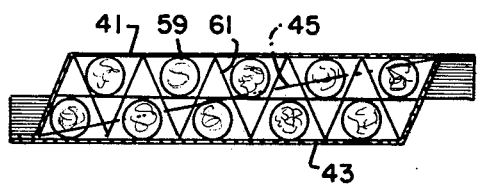
FIG. 7 is a plan view of the array of FIG. 6 taken along the lines 7—7.
Figure 8:
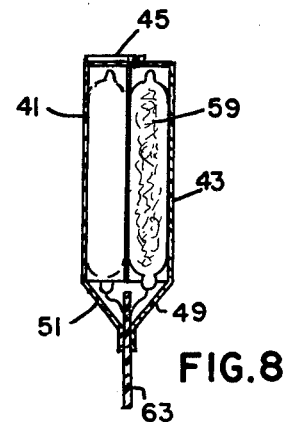
FIG. 8 is a cross-sectional view of FIG. 6 taken along the lines 8—8.

As can be seen in FIGS. 6, 7 and 8, the multilamp photoflash array 57 includes a plurality of interdigitated flashlamps 59 in back-to-back relationship. These flashlamps 59 are positionally located within a cavity of a reflector unit 61 with each one of the flashlamps 59 facing one of the side members 41 and 43. The flashlamps 59 are connected to a printed circuit board 63 by way of the space provided by the sloping or tapering sections 49 and 51 of the housing member 39. Moreover, the housing member 39 is bent along a diagonal directed fold line 45 and the relatively flat portions 53 and 55 of each of the side members 41 and 43 as well as the opposite ends 45 and 47 are sealed to provide an envelope for containment of loose particles should a flashlamp 59 exhibit such a condition.

In the process of fabricating a multilamp photoflash array in accordance with the above-described embodiment, a printed circuit board having a plurality of electrical circuits thereon is formed and a plurality of flashlamps are affixed thereto by any one of a number of well known techniques although soldering is preferred. These flashlamps are affixed in an interdigitated back-to-back relationship to the printed circuit board. A reflector unit may be, but not necessarily need be, formed to provide a plurality of cavity portions in back-to-back relationship with each cavity portion having a reflective surface thereon and formed to receive one of the interdigitated flashlamps.

A housing member is thermoformed from a single plastic sheet to provide a pair of light transmitting side members separated by a fold line. The housing member is folded along the fold line in surrounding relationship to the flashlamps disposed within the cavities of the reflector unit with each one of the flashlamps facing one of the light transmitting side members. Thereafter, the side members are sealed to one another and to the printed circuit board to provide an envelope containing the flashlamps and reflector unit as well as a portion of the printed circuit board.

Thus, there has been described a preferred form of multilamp photoflash array as well as a process for fabricating the array. Therein a single sheet of plastic material is utilized in a thermoforming process to provide a housing member for containing a plurality of flashlamps.

While there has been shown and described what is at present considered the preferred embodiments of the invention, it will be obvious to those skilled in the art that various changes and modifications may be made therein without departing from the invention as defined by the appended claims.

What is claimed is:

1. In a multilamp photoflash array having a plurality of electrically energizable flashlamps connected to operating circuits on a printed circuit board, the improvement comprising a single piece of plastic material thermoformed into a housing member foldable into a pair of substantially identical light transmitting side members affixed to one another and to said printed circuit board providing an envelope for containing undesired particles occuring upon energization of said flashlamps.

2. The multilamp photoflash array of claim 1 wherein each one of said side members is sloped to provide space for attachment of said flashlamps to said operating circuits.

3. The multilamp photoflash array of claim 1 including a pair of opposite-facing interdigitated lamp reflector units disposed within said housing member and containing said flashlamps.

4. The multilamp photoflash array of claim 1 wherein said housing member is offset to accommodate said printed circuit board.

5. The multilamp photoflash array of claim 1 wherein said housing member has a fold line running in a plane parallel to the plane of said side members.

6. The multilamp photoflash array of claim 1 wherein said housing member has a fold line running diagonally between said first and second side members.

7. A multilamp photoflash array comprising a printed circuit board having a plurality of electrical operating circuits, a pair of opposite-facing interdigitated lamp-receiving reflector units, a plurality of flashlamps each connected to an electrical operating circuit of said printed circuit board and disposed in one of said lamp-receiving reflector units, said array characterized by the improvement wherein a single piece of plastic material is thermoformed to provide a foldable housing member having a pair of substantially identical light transmitting side members affixed to one another and to said printed circuit board whereby there is provided an envelope for containing undesired particles occuring upon energization of said flashlamps.

8. The multilamp photoflash array of claim 7 wherein at least one of said pair of side members is sloped to provide accommodation for attachment of said flashlamps to said electrical operating circuits of said printed circuit board.

9. The multilamp photoflash array of claim 7 wherein at least one of said side members is offset to accommodate said printed circuit board.

10. The multilamp photoflash array of claim 7 wherein said housing member has a fold line in a plane parallel to the plane of said side members.

11. The multilamp photoflash array of claim 7 wherein said housing member has a fold line in a plane diagonal to the plane of said side members.

12. A process for fabricating a multilamp photoflash array comprising the steps of forming a printed circuit board with a plurality of electrical circuits thereon, connecting a flashlamp to each one of said electrical circuits thermoforming a foldable one-piece plastic housing member to provide a pair of substantially identical light transmitting side members, and sealing said side members to one another and to said printed circuit board whereby an envelope for containing undesired particles occurring upon energization of said flashlamps is provided.

13. The fabricating process of claim 12 including the step of thermoforming a sloping portion in each one of said substantially identical light transmitting side members to accommodate attachment of said flashlamps to said electrical circuits.

14. The fabricating process of claim 12 including the step of thermoforming an offset in at least one of said substantially identical light transmitting side members to accommodate positional location of said printed circuit board.

15. The fabricating process of claim 12 including the step of providing a fold in said one-piece plastic housing member in a plane substantially parallel to the plane of said side members.

16. The fabricating process of claim 12 including the step of providing a fold in said one-piece plastic housing member in a plane substantially diagonal to the plane of said side members.

* * * * *